(12) United States Patent
Heppe et al.

(10) Patent No.: US 10,686,609 B2
(45) Date of Patent: Jun. 16, 2020

(54) PROMOTING LEARNED DISCOURSE IN ONLINE MEDIA WITH CONSIDERATION OF SOURCES AND PROVENANCE

(71) Applicants: Stephen B. Heppe, Hood River, OR (US); Kenan G. Heppe, Los Angeles, CA (US); Trevor Wright, Alexandria, VA (US)

(72) Inventors: Stephen B. Heppe, Hood River, OR (US); Kenan G. Heppe, Los Angeles, CA (US); Trevor Wright, Alexandria, VA (US)

( * ) Notice: Subject to any disclaimer, the term of this patent is extended or adjusted under 35 U.S.C. 154(b) by 0 days.

(21) Appl. No.: 16/026,696

(22) Filed: Jul. 3, 2018

(65) Prior Publication Data

US 2019/0013953 A1 Jan. 10, 2019

Related U.S. Application Data

(60) Division of application No. 15/461,343, filed on Mar. 16, 2017, now Pat. No. 10,033,537, which is a continuation-in-part of application No. 14/092,549, filed on Nov. 27, 2013, now Pat. No. 9,639,841.

(60) Provisional application No. 61/732,164, filed on Nov. 30, 2012.

(51) Int. Cl.
| | |
|---|---|
| *G06F 21/64* | (2013.01) |
| *H04L 9/32* | (2006.01) |
| *G06Q 30/00* | (2012.01) |
| *H04L 29/06* | (2006.01) |
| *G06F 21/55* | (2013.01) |
| *H04L 9/28* | (2006.01) |
| *G06Q 50/00* | (2012.01) |

(52) U.S. Cl.
CPC .......... *H04L 9/3247* (2013.01); *G06F 21/552* (2013.01); *G06Q 30/00* (2013.01); *H04L 63/0823* (2013.01); *H04L 63/123* (2013.01); *G06F 2221/2147* (2013.01); *G06Q 50/01* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2005/0055458 A1* | 3/2005 | Mohan | H04L 29/06 709/238 |
| 2006/0010095 A1* | 1/2006 | Wolff | G06F 16/176 |
| 2006/0218492 A1* | 9/2006 | Andrade | G06F 17/24 715/234 |
| 2007/0156672 A1* | 7/2007 | Wolff | G06F 16/958 |

(Continued)

OTHER PUBLICATIONS

Using Multi-Encryption to Provide Secure and Controlled Access to XML Documents. Muldner et al. Exterme Markup Langauges. (Year: 2006).*

*Primary Examiner* — Venkat Perungavoor
(74) *Attorney, Agent, or Firm* — Jeffrey K. Riddle; Riddle IP, PLLC

(57) ABSTRACT

Systems and methods are disclosed for providing a chain of authenticated citations, from an original source document available online, through a chain of later documents and posts. Also disclosed are systems and methods of machine scoring of user posts based on metrics related to the expected veracity of cited sources, and the degree to which cited source material or verifiable online content may have been modified.

6 Claims, 5 Drawing Sheets

(56) References Cited

U.S. PATENT DOCUMENTS

| | | | | |
|---|---|---|---|---|
| 2007/0156777 A1* | 7/2007 | Wolff | .................. | G06F 16/93 |
| 2008/0059800 A1* | 3/2008 | Piersol | .............. | H04N 1/32101 |
| | | | | 713/176 |
| 2009/0327855 A1* | 12/2009 | Le | .................. | G06F 16/9558 |
| | | | | 715/230 |
| 2011/0137975 A1* | 6/2011 | Das | .................. | G06F 21/6254 |
| | | | | 709/203 |

* cited by examiner

PROMOTING LEARNED DISCOURSE IN ONLINE MEDIA WITH CONSIDERATION OF SOURCES AND PROVENANCE

RELATED DOCUMENTS

The present application is a Divisional of U.S. application Ser. No. 15/461,343 filed on. Mar. 16, 2017, which is a Continuation in Part of U.S. application Ser. No. 14/092,549 (now U.S. Pat. No. 9,639,841) by Stephen B. Heppe and Kenan G. Heppe, filed on Nov. 27, 2013, which claims priority under 35 U.S.C. § 119(e) to U.S. Provisional Application No. 61/732,164 by Stephen B. Heppe et al., filed on Nov. 30, 2012, and entitled "Promoting Learned Discourse in Online Media," which applications are hereby incorporated by reference in their entirety.

BACKGROUND

Many web sites provide a method for public feedback ("posts") regarding their content. Examples include the many news organizations that allow readers to post comments on online news articles and features. The ability of individual readers to post public comments is generally viewed as a positive feature, contributing to public discourse, enabling the correction of errors, allowing members of the community to express their opinions, and also contributing to a general feeling of "engagement" by members of the community. It has been suggested that people participate in online posting activity (both reading and writing) because they seek information, personal identity, integration and social interaction, or entertainment (see, for example, Nicholas Diakopoulos and Mor Naaman, 2011). Unfortunately, some of the posts may be considered to have relatively low "quality" by several measures. For example, they may contain profanity or hate speech, lack relevance to the associated article, lack factual accuracy, or lack uniqueness. News organizations (and other entities hosting web sites allowing public feedback and postings) would prefer a high level of discourse as well as a dynamic, energetic online conversation that does not stifle discussion or dissent, yet minimizes the number of low quality posts. Many news organizations (and other entities) also hold a commitment to the First Amendment rights protected by the US Constitution. Attempting to satisfy these diverse objectives, in the context of an online forum that generally allows for a degree of anonymity, is recognized as a challenging problem. A popular site could receive hundreds or even thousands of posts per day, making human mediation and pre-screening a costly proposition. Human pre-screening also runs the risk of injecting the mores and prejudices of the human mediator (or moderator) into the screening process a recognized concern given the desire to promote free and open debate while ensuring civility. Typical methods to address this problem include, inter alia, a) Requiring a user to open or register an account, with a valid email address, prior to any posting;
b) Allowing users (readers) to "recommend" or "like" a post, or alternatively to "report abuse";
c) Providing a method to take down or hide postings that are deemed abusive;
d) Providing a method to block certain users (identified as "abusers") from making publicly-viewable posts;
e) Providing a method to track, and respond to, users who abuse the "report abuse" feature.

As one example, the Slashdot site provides a threaded discussion on individual news stories with a user-based moderation system. Users have differing levels of "karma" based in part on their prior activity, and some users, at any instant of time have the ability to "moderate" comments (posts) of others, increasing or decreasing their score and adding descriptors such as normal, offtopic, flamebait, troll, redundant, insightful, interesting, informative, funny, over-rated, or underrated. Paid staff can also moderate comments; When a comment is initially submitted, it is scored from −1 to +2 depending on the user's registration status and prior history (their "karma"). Over time, as moderators do their work, comments can be rated on a scale of −1 to +5. Users (readers) can set a threshold level so that they only see comments at or above the selected threshold.

Many sites allow a user to "report abuse", and comments that receive an excessive number of reports are automatically deleted from the viewable area. Generally, sites implementing such systems also route the comments identified as abusive to a human reviewer, allow for the human reviewer (generally a paid staff member) to alter the access privileges for the posting user (perhaps blocking all further comments from that individual from public viewing). This also creates a need to "review the reviewers", and provide a method to identify users who abuse the "report abuse" feature, and deal with their behavior appropriately.

The existing methods contribute to a degree of discipline and civility, and in some cases (such as the quality filter implemented by Slashdot) allow users to screen comments before reading so as to limit their reading to comments that have already been judged to have high quality. The Slashdot approach also allows certain users to achieve high "karma" which allows a higher degree of recognition for users that have contributed productively to civil and high quality discourse in the past. However, the results are imperfect. Low quality comments continue to be posted, and users that have achieved high karma (on sites that support ranking of users) cannot easily transfer that positive recognition to other sites.

In addition to web sites that promote online discussion and dialog, as generally described above, there are web sites that promote online collaboration such as Taskrabbit and StackOverflow. In these environments, users have an incentive to achieve high recognition or high reputation (which may each be qualitatively related to high "karma"), since high recognition or high reputation confers benefits on the site as well as elsewhere. For example, on Taskrabbit, users with high reputation have greater success in competing for tasks. This confers a direct economic benefit. Users with high reputation on StackOverflow have, in some cases, started reporting their StackOverflow reputation on job resumes. However, aside for self-reporting a user's level of recognition in other fora, the ability to transfer one's reputation or karma from one forum to another is awkward and subject to interpretation. Reputation or karma is a measure of how much a given community trusts a given individual. Assuming reputation or karma can be accurately measured with respect to a given community, how should the same measure of reputation or karma be treated with respect to a different community? Ideally, a method would be developed to allow the value of a user's reputation or karma, in one community, to be transferred and evaluated (i.e., interpreted or "weighted") with respect to a different community.

Recently, an additional problem has been recognized so-called "fake nears" and the difficulty of sorting fact from fabrication in online media. In order to address this problem, recent initiatives have included contextual warnings (e.g., "be careful"), clear display of the source of a post or story, labeling or flagging of suspect links (including a feature allowing human readers to flag seemingly false stories—a form of human moderation and scoring), outside fact-checking, pairing of stories or posts with others that provide "balance", and scoring methodologies that try to rely on other presumed-credible sources on the same topic. These are useful ideas, but many depend on human moderation or scoring and can be tedious to implement. A machine-implemented method, that could provide some insight into the provenance and likely veracity and authoritativeness of a story or post, would be desirable. One challenge, however, is to do this in a way that is demonstrably even-handed. The machine-implemented method should favor fact-based discussion without excluding posts and stories, and the like, merely because the viewpoints expressed are unpopular. Another challenge is that popular stories (or at least the apparent facts underlying popular stories) are frequently repeated either with or without citation. This makes it difficult to assess the full provenance and veracity of a story, post, or news article, using current methods.

Based on the above discussion, it would be desirable to have further methods to promote a high quality of fact-based discourse. Ideally, posts and stories without demonstrable factual support would be automatically flagged as being potentially unreliable, while still allowing content creators to conveniently create original content with or without reference to a wide variety of already-available sources.

Furthermore, it would be desirable for users that have achieved a degree of positive recognition, on one site, to be able to productively identify that fact on other sites, representing similar or dissimilar communities, while minimizing the chance for abuse or inappropriate interpretation associated with such cross-site recognition. Furthermore, from the standpoint of at least some web hosts, it would be desirable to "monetize" a higher quality of discourse by attracting advertisers and other online services to discussion threads that are recognized as higher quality compared to others. Ideally, these goals would be achieved without significant infringement of a user's First Amendment rights. It is the objective of the present invention to achieve these and other goals, as discussed below.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
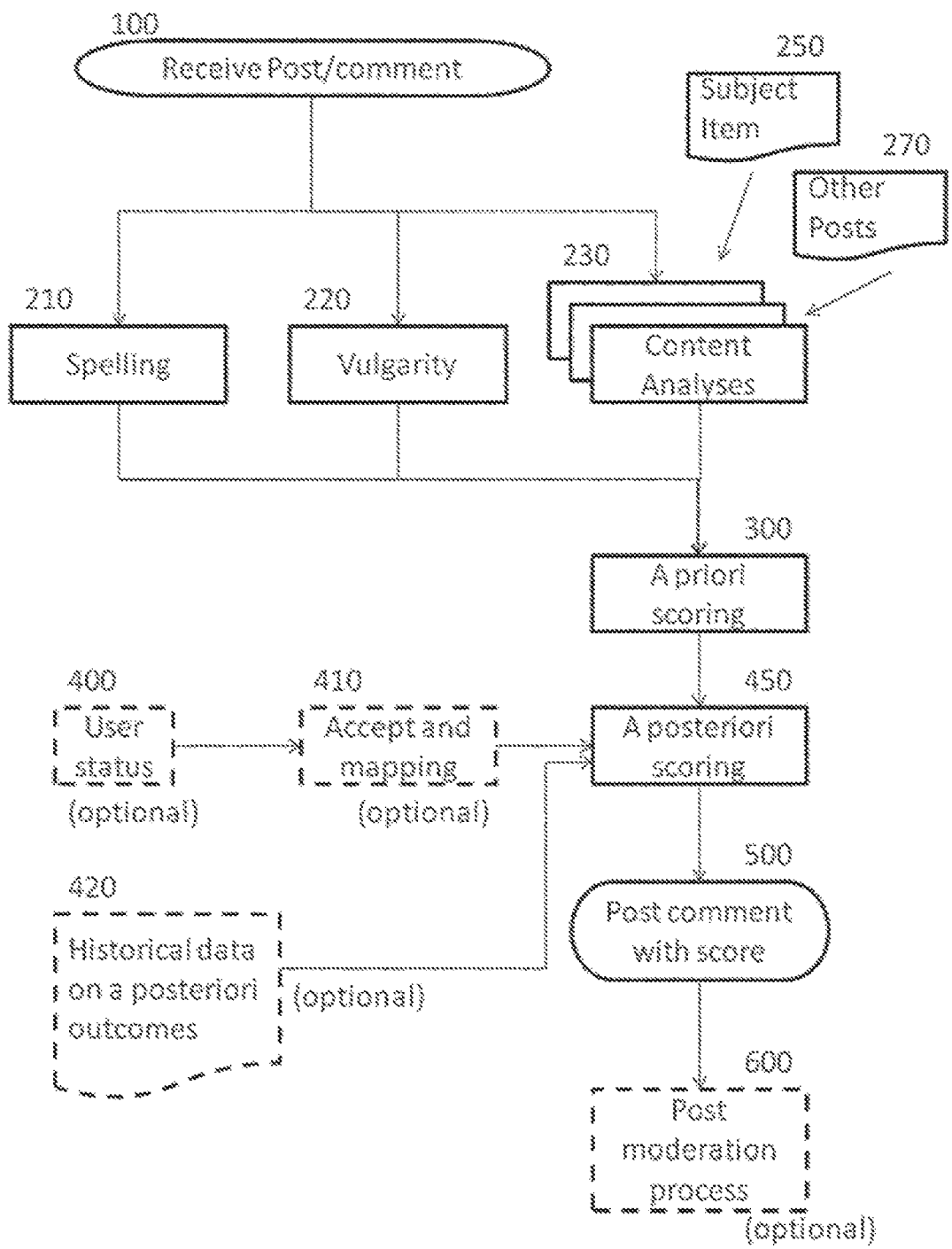
FIG. 1 is a flow diagram illustrating one method of assigning an a posteriori initial score to a comment or post, based on its content and optionally on user credentials offered by a user, according, to one example of principles described herein.

The principles described herein provide benefits, in some cases portable benefits, to users that consistently generate high-quality comments (posts). This is achieved by providing a method for a host site or entity to issue authenticated certificates of quality, reputation, or recognition (roughly analogous to a certificate of "high karma" in the Slashdot lexicon) which can be made portable between sites and other entities, while providing protections against counterfeiting and transference to other users. Furthermore, with respect to online discussion sites, the invention provides benefits to host sites by contributing to a higher, quality of discourse, which can be expected to lead to greater "readership" and the potential for monetization or enhanced monetization. This is achieved by, first of all, encouraging users to make high-quality posts, and secondly, by providing additional methods to moderate the discussion to provide a high-quality user experience for readers while ensuring that First Amendment rights are preserved.

The principles described herein also provide mechanisms to track and highlight the provenance of information within a comment, post, news story, or the like (generally; a "user post"). Mechanisms are provided to check for internal consistency against certain cited references, and to score user posts on the basis of their cited references and the apparent consistency of the post vis-a-vis the cited references.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

The invention assumes that many users who post comments seek recognition and status in the online community (at least) even if they may also seek anonymity. For example, they may create online identities and persona for themselves that are not easily connected to their true names and addresses, but still crave recognition and status for their online persona. They may have other motivations as well (e.g., gathering information, altruistically correcting errors in online discourse, social interaction, and entertainment). A user with high status might receive a degree of deference from others; his or her posts might gain greater recognition (perhaps becoming more visible to users who sort comments wholly or in part on a commenter's status). This might even contribute to monetary benefits for the high-status individual (such as an enhanced ability to compete for work, either through online fora or by reporting on a resume). A first method to encourage civil discourse, according to the methods of this invention, is to provide a portable "certificate of status" that can be displayed by the user on sites other than the awarding site (or offered to a potential employer by electronic means), yet cannot be casually stolen or transferred to other users and cannot be counterfeited. In a sense, this certificate is analogous to a degree from a university or a certificate from a professional society. It would confer a degree of recognition to a user, allowing the user to enjoy high status on a new site or in a new community that the user had never before visited (as well as other sites), even though the user remained anonymous with respect to his/her true identify. It is expected that certificates of status will be awarded sparingly by a host site perhaps through a process requiring human decision-making since a user's online activity on other sites or in other communities, using the awarded certificate, will reflect on the status and prestige of the awarding site. Potentially, certificates may also "time out" after a given period of time, with replacement certificates being automatically awarded and delivered to the user based on his or hers continued and desirable online activity.

The objectives noted above can be achieved with certificates that are authenticated using a public key encryption system, several of which are known to those skilled in the art of computer security and authentication. One exemplary embodiment will now be described by way of a hypothetical example.

For this hypothetical example, a user named "Bob" maintains an account with "WebOneNews", an online site featuring news and commentary. Bob's online nickname—the name by which readers of the site know him—is "newshound". Bob secured this nickname by setting-up an account with WebOneNews, a process which required him to identify and confirm his email address (note: before awarding the nickname, WebOneNews verified that no other user bad previously selected the same nickname). The account information, including at least the nickname and valid email address of the true user (Bob), along with a secure password, is considered to contain private data and is protected from public disclosure. The account information might also contain other data, such as multiple email addresses, true name and address, one or more public keys provided by Bob to facilitate secure and authenticated communications, and perhaps even biometric data (or a secure hash of biometric data).

WebOneNews provides a mechanism for its news items and commentary (user posts) to be "ranked" by a combination of automatic and/or human-mediated means. Hence, users can quickly select the items of greatest value according to several metrics (e.g., accuracy, humor, topicality, civility, novelty, and overall quality). Bob is active on WebOneNews, and over an extended period of time, users have come to appreciate the comments appearing under his nickname "newshound". These comments regularly achieve high metrics and are frequently cited by others. WebOneNews maintains a system of authenticated certificates for its top contributors, with authentication provided through a public key encryption system as will be shortly described. After some period of time, WebOneNews determines that it would be appropriate to award Bob a certificate indicating his contribution to the online community. The mechanism by which WebOneNews makes this determination is not germane, but could involve a totally automatic (software-based) process, a purely manual (human) process, or a combination of software analysis, alerts/flags to human staff, and human decision-making. Once the decision is mad; the certificate is awarded and used as follows.

WebOneNews can access the email address(es), associated with the nickname "newshound", by checking the private account information held by the site. Assume initially that only one email address is on record. WebOneNews generates a certificate of performance referencing Bob's nickname and email address, updates Bob's account information to indicate the existence of a certificate, and encrypts the certificate using WebOneNews' private key. It sends the encrypted certificate to Bob's email address and Bob stores it for future use. [Note: Bob's posts to WebOneNews can automatically display an icon indicating the awarded certificate (although Bob may optionally be given veto power over this display) since his account information contains his new status]. Bob can decrypt the certificate using WebOneNews' public key. Anyone else can do the same, using the public key associated with WebOneNews, but only WebOneNews can generate the certificate in the first place and encrypt it using its private key.

Bob may already be participating on a second news site called WebTwoNews, or may decide at a later time to open an account with WebTwoNews. In either case, Bob would like to display the certificate from WebOneNews on his posts at WebTwoNews. To do this, his account information at WebTwoNews must reflect the fact that he has received a certificate from WebOneNews. For the moment, assume that Bob used either the same nickname or the same email address to setup his account at both WebOneNews and WebTwoNews. He can update his account information at WebTwoNews by transmitting the encrypted certificate to WebTwoNews as additional account information, indicating that the transmitted certificate is from WebOneNews. Bob cannot counterfeit this certificate since it was encrypted with the private key held by WebOneNews. When it receives this certificate from Bob, as part of the account update process (involving Bob's nickname and/or email address and a secure password), WebTwoNews can decrypt the certificate using the public key for WebOneNews, and verify that it contains the nickname and/or email address associated with the account being updated. The account update can then be completed and confirmed. Since the certificate contains Bob's identifiers and can only have been generated by WebOneNews, WebTwoNews is fairly confident that Bob is not using a certificate belonging to someone else. Similarly, there is little risk of Bob's certificate being stolen/intercepted and misused by a third party—the certificate is only useful to someone using Bob's nickname and/or email address.

Clearly, the method can be extended to multiple identifiers associated with Bob's account at WebOneNews and only one of the identifiers needs to match the account information maintained at WebTwoNews in order to enable the update. This provides flexibility and allows Bob to maintain several online identities (and email addresses), and even use other forms of identification (such as biometric data). However, Bob may be loath to receive and use certificates containing such detailed and multi-faceted private information. The consequences of misuse can become more severe as the amount of private information contained in the certificate increases. This concern is addressed further below.

If additional transmission security is desired, WebOneNews can transmit the certificate to Bob with a second (outer) layer of encryption using Bob's public key, which may be detailed in his account information or may even be published on the web (keyed, e.g., to his nickname). Only Bob can decrypt this transmission using his private key, thereby extracting the encrypted certificate from WebOneNews (which only WebOneNews could have generated). Similarly, Bob can transmit the encrypted certificate from WebOneNews to WebTwoNews in a secure fashion by encrypting the (already encrypted) certificate using the public key from WebTwoNews. Only WebTwoNews can decrypt this message using its own private key.

In addition to sites devoted purely or primarily to online discussion and discourse, these techniques can be used to transfer a certificate of reputation or recognition (karma) to a site focused on other goals, such as online collaboration, or even to users/entities such as traditional companies that a holder of such a certificate may wish to inform as to his/her status.

There is a potential for some third party to setup an account on a site which Bob does not frequent ("WebThreeNews"), and use the nickname adopted by Bob on e.g. WebOneNews. If this third party were to somehow intercept or steal the encrypted certificate from WebOneNews, without any outer layer of protection, he or she could send it to WebThreeNews and potentially gain the status advantages enjoyed by Bob. Worse, the third party would also have access to any of Bob's private data contained in the certificate. In order to provide a measure of security against such misappropriation, WebOneNews can use a public key provided by Bob and contained in his account information (in some embodiments of the invention). For example; instead of recording Bob's nickname and email address in the certificate (and possibly other email addresses and other private identifying data), WebOneNews could simply record a hash consisting of the nickname used by Bob on WebOneNews and its associated public key. When WebThreeNews receives a certificate from someone with the nickname "newshound", it can generate a challenge for the individual with nickname "newshound" at WebOneNews (the original source of the certificate) which only Bob can answer. This method requires the additional step of a cryptographic challenge, but avoids any need to include Bob's identifiers and/or private data in the certificate.

While the examples provided herein are generally based on web sites devoted to news commentary and online discussion, the inventive concepts can be applied to other types of sites and domains where credentials or certificates of achievement are used. This includes, but is not limited to, professional discussion sites, online collaboration sites, job search and job clearinghouse sites, and the like. The inventive concepts can also be used, with adjustments; to allow for the necessary communication of data, outside the internet domain (e.g., on private networks and even in offline environments), as long as the certificates can be communicated from an awarding entity to a user, and from a user to another entity that wishes to determine an effective level of achievement for the user.

Content Checking and Information Provenance

The problem of "fake news" is multi-faceted, and providing mechanisms to check the provenance of information mechanically (i.e., without extensive human research and fact-checking) may depend on some cooperative behavior by "good actors" with a vested, interest in supporting a high quality of online discourse. These "good actors" could be individuals, reputable news organizations, publishers of technical and scientific journals, government organizations, and the like.

Figure 3:
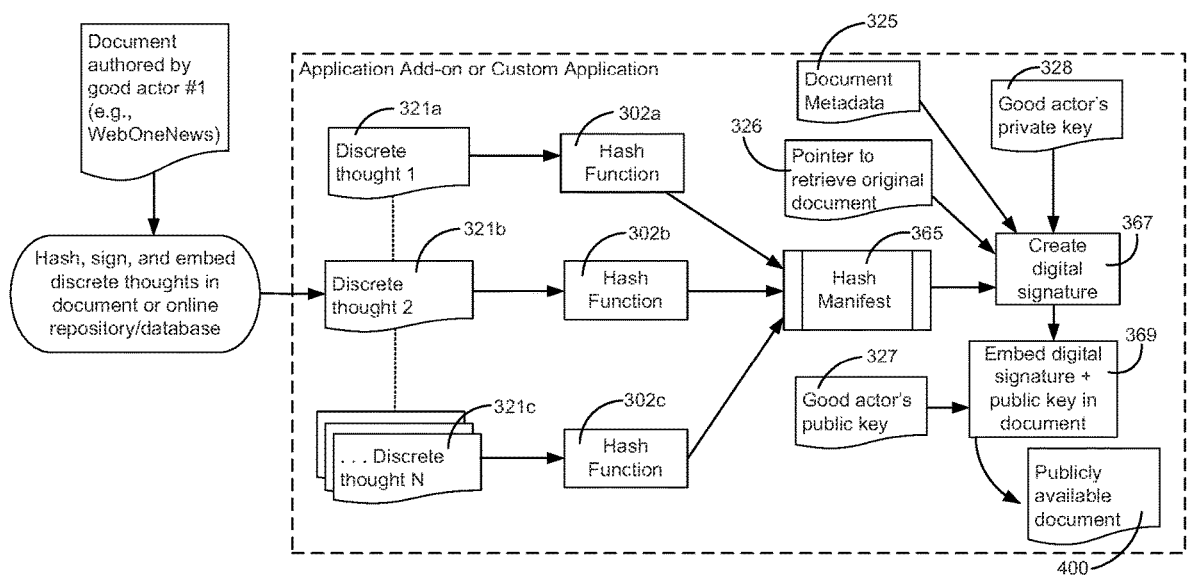
FIG. 3 is a flow diagram demonstrating one approach of generating and embedding hashes for discrete thoughts in a document, which can then be cited and validated in a subsequently-generated third-party document.

Consider a "good actor" such as WebOneNews (in the prior discussion) or "ScienceOne" (the e.g. publisher of a science publication that is well-respected and has been in existence for many years). Each has an online presence (a "web site") with published content and other information such as, e.g., information about themselves including at least one public key that can be used in a public key encryption application. The published content may mirror a traditional print publication, or perhaps be solely available online. Each such actor has an interest in ensuring a high quality of online discourse; each would also like the public at large to rely on their published content and cite it widely (as well as accurately). Referring now to FIG. 3, in order to protect their own reputation, as well as to ease the process of citation by others, each such "good actor" could provide their online content wherein every discrete thought 321 (such as e.g. every sentence and every figure or illustration) is separately "hashed", in a step 302, and subsequently encrypted and digitally signed using the good actor's private key 328.

NOTE: This flow diagram demonstrates adding the hash of all discrete thoughts to a single manifest (or database), which is then signed by the good actor's private key. It is also possible to sign the hash of each discrete thought individually, and embed each signature in the document (or store each signature in a database) separately.

An alternative to the brute force approach is to create an indexed "hash manifest" 365, comprising all the hashes in the online work, and digitally sign the indexed hash manifest as a whole. In one embodiment, the digital signature operates over the indexed hash manifest, a defined set of bibliographic data for the work, and a pointer or URL to retrieve the original document from an online repository.

The indexing method in the hash manifest may depend on the type of document or online content involved. Exemplary indexing methods include, without limitation, a frame count for a video clip, a byte position in a data file, and a simple index of hashed elements in a file. In some cases, the indexing in the hash manifest may be uniquely dictated by the nature of the content. For example, a video, file containing a series of video frames may offer a natural indexing method where the video frames and their associated hashes are sequentially indexed. In other cases, such as a document containing a combination of text, images, and other content, the indexing may not be uniquely dictated by the content. For example, there may be no obvious rationale to order the hashes for a combination of text and images in a particular way. In such cases, the online document may be augmented to include hidden indexing data to assist in cross-referencing the content elements with their associated (indexed) hashes in the manifest.

Regardless of how the hashes are generated and digitally signed, this additional data is accessible by external actors such as Bob, who had maintained an account with "WebOneNews" in the example described herein. The additional data allows Bob to verify the provenance of the content that he wishes to cite and embed in his own document (i.e., a particular "discrete thought", image, etc). Furthermore, Bob can include this additional data in his own document (bundled, keyed or indexed to the content to which it refers), allowing third-party consumers (i.e., Bob's readers) to also validate the authenticity of each citation.

Figure 4:
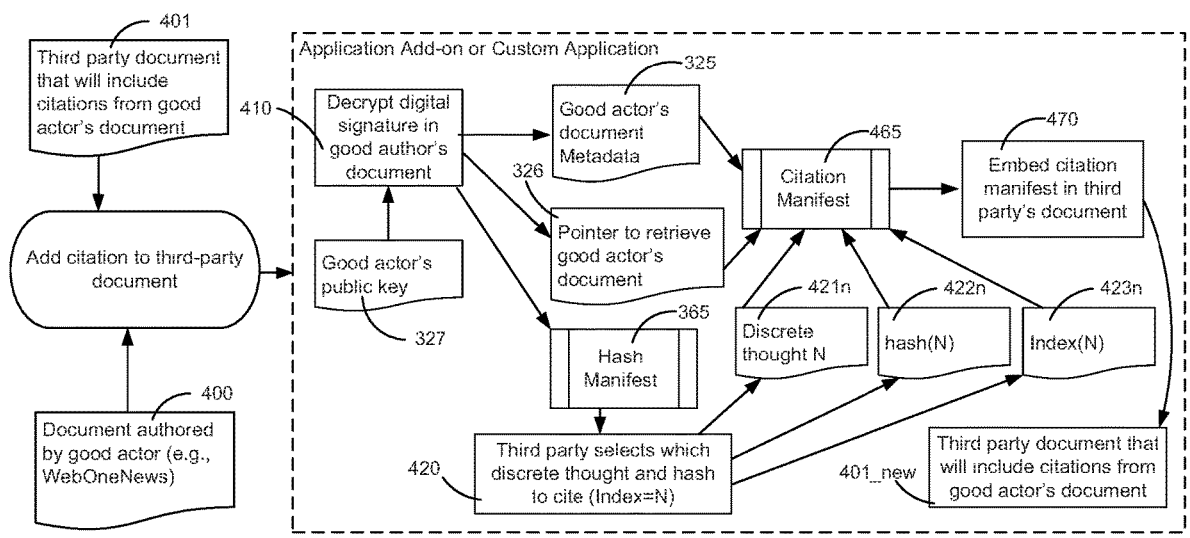
FIG. 4 is a flow diagram demonstrating one approach for citing content from a document containing authenticated material generated, e.g., by the process of FIG. 3.

FIG. 4 is a flow diagram demonstrating one approach for citing content from a document containing authenticated material generated, e.g., by the process of FIG. 3. This flow diagram demonstrates adding the hash of all discrete thoughts to a single manifest (or database), which is then signed by the good actor's private key. It is also possible to sign the hash of each discrete thought individually, and embed each signature in the document (or store each signature in a database) separately. With reference to FIG. 4 as well, when the original content is created as an electronic or online document 400 (by, e.g., WebOneNews), the digitally-signed hash manifest (or set of digitally-signed hashes) could be embedded directly in the document, or stored in a remote database. If stored in a remote database, a pointer to the e.g. digitally-signed hash manifest in the remote database can be embedded in the document. Once a remotely-stored digitally-signed hash manifest is retrieved, containing e.g. the associated bibliographic data and pointer, it can be decrypted with the public key of record for the source provider, and the pointer as well as the hash manifest itself can be authenticated.

While the process of separately hashing every sentence, figure, audio clip, or video in an online offering may seem daunting, current computing systems have capabilities to accomplish this and the additional data volume (incremental file size) associated with the embedded hashes and bibliographic pointers (if they are actually embedded in the document) is tolerable given the benefits achieved. The bibliographic data and hash would be hidden in a normal display view of an electronic or online document, but accessible to a user if desired.

A user (e.g. Bob) could choose to quote from the visible content without relying on the hidden authentication data, just as is done today. Alternatively, Bob could choose to copy an entire "thought" 421 (such as e.g. a particular sentence or figure), or multiple thoughts, along with the associated metadata including the bibliographic pointers (and the data to which they point) and hash information (single or multiple), and reference the information in the new content that Bob is developing. For each content element Bob chooses to cite in this way, he would include the thought itself (thought N), the associated hash 422, and the pointer or index (N) 423 pointing to the hash in the original hash manifest.

Of course, Bob can provide multiple citations to a single prior reference, as well as citations to multiple prior references, using the same concept as elucidated here.

It is envisioned that, in many cases, Bob may choose to submit a comment or post (401_new) containing cited content without digitally hashing and signing each sentence of his own submission. This might be appropriate, for example, in the case of comments and posts that are expected to be relatively ephemeral. On the other hand, similar to WebOneNews and ScienceOne, Bob may be a "good actor" with an online presence and a known/published public key (whether or not he maintains a dedicated web site) and an interest in protecting his own reputation and ensuring a high quality of online discourse. Bob would also like the public at large to rely on his published content and cite it widely (as well as accurately). Thus, similar to WebOneNews and ScienceOne, Bob could provide online content wherein every discrete thought (such as e.g. every sentence and every figure or illustration in a comment or post) is separately "hashed" and signed using his private key (either individually, or through the use of a hash manifest). For content that is newly created by Bob, or at least unattributed, this metadata is generated as described previously in relation to FIG. 3 and the example of WebOneNews. For content elements (e.g., discrete thoughts) that Bob has attributed to another source, Bob's hash encapsulates at least the cited content. Note that the public key of the source of the original content, or a suitable pointer, is also used in order to allow third parties to verify the cited content. If the cited content had an individually-signed hash, Bob can embed the originally-signed hash in his own document and provide his own hash over the cited content with its originally-signed hash. If the cited content was protected by an indexed hash manifest with a single digital signature, Bob can provide bibliographic data (or a pointer) to the original source document or hash manifest, along with an index into its hash manifest for the particular content element that Bob has cited.

The data in Bob's document is accessible by external actors; such as Alice, so that Alice may verify the provenance of the content in Bob's document that she wishes to cite and embed in her own document (i.e., a particular "discrete thought", image, etc). Alice can recursively apply the methods discussed above, for accessing and verifying the provenance of cited content, to open and examine multiple nested levels of content. In this way, Alice can verify that Bob actually cited the original content, with or without adjustments, and trace back the material to the original source. It is anticipated that most content in a typical post will have only a single layer of authentication. Successively smaller fractions may have two layers of authentication. Even more successively smaller fractions may have three layers of authentication, etc.

Figure 5:
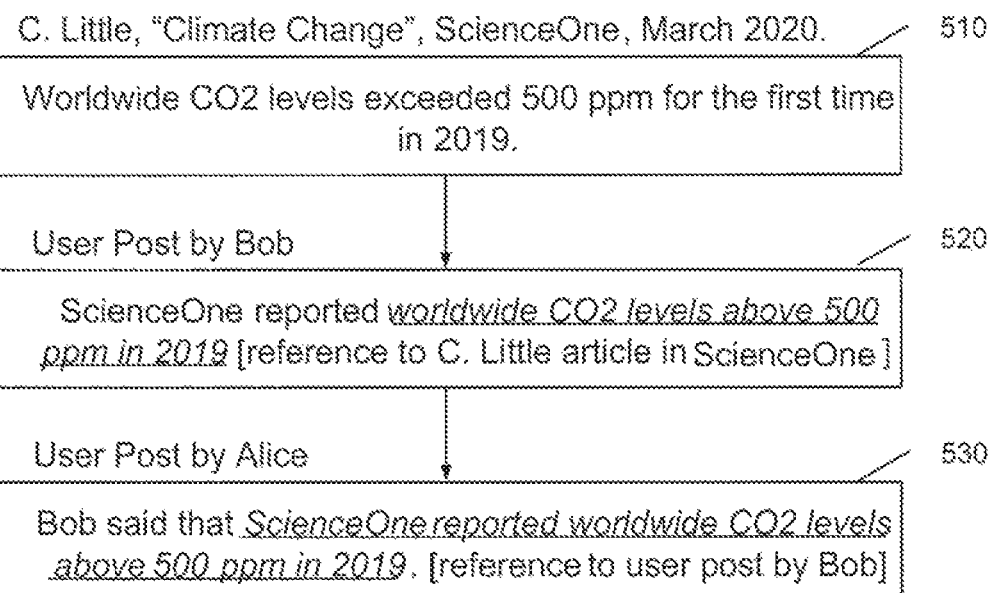
FIG. 5 is a block diagram showing a sequence of online documents and/or user posts showing the involvement of nested content according to an example of the principles described herein.

Referring now to FIG. 5, a sequence of online documents/ user posts is shown involving nested content. An original source document 510, authored by "C. Little", contains an exemplary content element "Worldwide CO2 levels exceeded 500 ppm for the first time in 2019." In this example, the content element is hashed and digitally signed (either individually, or as part of a hash manifest) using ScienceOne's private key. Bob prepares a user post 520 which paraphrases this content element. In FIG. 5, the paraphrased content is indicated by the italicized and underlined font in the user post 520. While Bob has chosen to paraphrase the ScienceOne content element instead of quoting it exactly, he nevertheless includes bibliographic data along with ScienceOne's digitally-signed hash for the content element (or a pointer into a hash manifest, along with sufficient information for a third party to retrieve the hash manifest and apply the proper public key). Optionally, Bob can include the full text of the ScienceOne content element as "hidden text" in his own post, although this information could also be retrieved from an online repository if Bob provides the appropriate bibliographic data and/or pointer. This allows a third party to both authenticate the original content, and check the degree to which Bob's paraphrasing captured the original content. Bob then digitally signs a hash for the entire content element in his own post (or digitally signs a hash manifest containing a hash for this content). Finally, Alice prepares a user post which quotes Bob's hashed content element exactly, including any reference data Bob provided back to ScienceOne (this is indicated in the italicized and underlined text in user post 530). Alice includes bibliographic data for Bob's user post along with Bob's digitally-signed hash for his content element (or a pointer into a hash manifest prepared by Bob for his user post, along with sufficient information for a third party to retrieve Bob's hash manifest and apply the proper public key). This allows a third party to both authenticate the content provided by Bob, and verify that Alice captured Bob's content exactly. Using the information embedded in Mice's post, or accessible from this information, one of Alice's readers can also trace back (recursively) to the original content provided by ScienceOne.

The metadata and hash information could remain hidden, but would still be accessible to a human reader with suitable visibility tools. For example, any reader with suitable computer support such as, e.g., an add-on browser application adapted to this function, could check a digitally-signed hash to verify that it indeed verifies the visible content to which it is related (such as the e.g. sentence or figure). This could be a semi-automated process where the reader clicks on a particular sentence to verify its provenance, the reader's e.g. web browser retrieves the public key of the indicated source, and verifies the authenticity of the cited content. Alternatively, the verification could be an automatic process wherein all such "hashed" content within a user post is automatically checked when the user post is opened by another user or reader (e.g., in a web browser), with individual and aggregate results for the entire user post indicated either with highlighting, added symbology, font adjustments, auxiliary windows, or other user interface options. In this way, Alice (for example) can assure her readers (followers) that she has correctly represented the information from the indicated source, and that the indicated source has essentially "signed" the information to guarantee its provenance.

With proper editing tools, user workload can be simplified and the bibliographic data could be made to appear as a footnote in a newly created user post. For example, if Bob copies a single sentence from ScienceOne, an editing too adapted to this application could enclose the copied material in quotes (or set it off as a block quote), and display the bibliographic data as a footnote along with a visual indicator indicating the presence of a hash (even though the metadata and hash (or at least pointer(s) to the metadata and hash) is/are actually bundled with their associated sentence in the e.g. html document). The visual indicator could be interactive, such that a user or reader could trigger an application to check the authenticity of the cited material. The application could then validate authenticity in two ways: 1) validate immediately if the hash is embedded in the document; 2) query the remote application and database which returns a validation response.

If Bob copies multiple contiguous sentences, an editing tool adapted to this application could provide a visible listing of all the bibliographic metadata for Bob to edit in a footnote (to e.g. remove redundancy and/or reformat), along with an indicator or indicators indicating the presence of available hashes and metadata associated with the copied text, indicating that a user/reader could trigger an application to check the authenticity of the cited sentences as discussed above. A more advanced editing tool adapted to this application could perform this editing automatically, optionally showing Bob the suggested format using a "Track Changes" feature, which would allow Bob to accept the automatically-generated footnote or edit it according to his wishes (perhaps adding additional commentary in the footnote). Importantly, each originally-hashed sentence (more broadly, each originally-hashed content element) is still checked by its own unique hash.

The same concepts as noted above can be applied to material other than text, for example, figures, embedded audio clips, and embedded video clips.

Of course, it is not always desired to quote entire sections of text (and possibly related material). Sometimes, as illustrated in FIG. 5, a content creator (Bob) may wish to paraphrase a primary source or provide an incomplete quote (for example, with some extraneous words omitted for conciseness, but replaced with ellipses to show the point of omission), or simply point to an external reference that provides factual support for content created by the creator (Bob). The bibliographic data and hash can still be copied into Bob's new user post, but of course it could no longer provide machine verification of the incomplete or paraphrased or newly-created material. If Bob does not wish to provide authentication to how he has chosen to cite the primary material, he could simply delete the hash (or even leave it in place, where it would indicate that the material is not a perfect match). The original content can be accessed by one of Bob's readers, "Alice", by reliance on the bibliographic data and pointer information to the original source document, which is still accessible. Alternatively, Bob could embed the entire section of cited material as "hidden text" in his new user post (with his edited version remaining visible). The hidden text can be made accessible to interested users/readers such as Alice, and provides another way to verify the provenance of the primary material (i.e., since it can be still be checked against its associated hash(es)). An interested user/reader can also compare the hidden text to Bob's visible text to verify that Bob has represented the cited material fairly, and/or properly based his new material on the cited material. Machine methods to perform this function are discussed below.

One exemplary method for allowing Bob to, create paraphrased text, that is still verifiable, is explained as follows. Assume Bob is to cite an entire paragraph from ScienceOne, but paraphrase the paragraph for brevity and to focus on a particular aspect. Assume also that each sentence in the paragraph from ScienceOne is separately hashed (and also has a pointer to the associated bibliographic data). As a first step, Bob copies the entire paragraph into his new user post, preserving the hashes and bibliographic data. Next, he highlights the paragraph and selects an option (in an editing tool adapted to this function) to paraphrase the selection while preserving provenance information. This has the effect of creating a "hidden copy" of the entire paragraph, along with its metadata, while showing a visible copy along with an indicator, pointer, icon, footnote, endnote, or equivalent (generically, a "pointer") to the hidden copy. Note that, in a printed context, the hidden copy would be available e.g. as an "end note" at the end of Bob's new post. Bob can edit the visible copy in any way he wishes; the pointer points to the complete hidden copy along with its metadata. An interested user/reader, seeing the visible copy is associated with a pointer (either due to a visible icon, or a difference in font or background color, or some other means) could then, for example, access the hidden copy in a pop-up window, similar to a "comment window" in currently-available document applications such as WORD®, to check the authenticity of the material and the accuracy of Bob's paraphrasing. WORD® is a word-processing program developed by Microsoft.

While this discussion has focused primarily on web browsers and html content, and how the authentication process would work in the context of a web browser, the concept is not limited to this narrow domain. For example, a WORD® document or a pdf document could contain html material, and a user viewing Bob's post or content, in one of the applications associated with these file types, could similarly check the authenticity of cited material, assuming a similar add-on (or built-in) function/application adapted to this function, and assuming that the user/reader had access to the interact so that the public key of the indicated source can be retrieved.

Perspective of the Host Site

From the standpoint of a host site, there is a desire to ensure, to the extent that is practically achievable, that the quality of discourse on the site is of relatively high quality, including verifiable facts and authenticated sources when source material is cited. This would tend to contribute to the enjoyment of the site's patrons, the prestige of the site, and possibly contribute to monetary benefits as well. For example, a popular and high-prestige site might attract a larger and more connected audience than the average site, making the site more attractive to sponsors and advertisers. Several existing pre- and post-moderation techniques can be used to manage comment quality; however, reliance on such techniques alone is problematic for several reasons including:

f) Pre-moderation by a human being is costly and time-consuming, and runs the risk of injecting "moderator bias" into the decision-making process. Potentially valuable and innovative or controversial comments might be excluded improperly prior to any public viewing;

g) Post-moderation allows low-quality comments to appear for a time (at least), prior to the post-moderation protocol lowering their score below a user-selectable threshold (as in the Slashdot protocol), or otherwise causing their removal from the viewable area (for example, if enough users identify the comment as "abusive", thereby causing the site to automatically remove it from viewing (along with other actions, such as forwarding the objectionable post to a human reviewer));

h) Protocols that intermingle all comments on a given topic with time-varying, measures of quality (i.e., in response to human moderator actions), with user-selected viewing thresholds, can complicate the task of "following the thread of a conversation" since some currently viewable "high-quality" comments will be responding to currently "low-quality" comments that are not viewable at a user's current threshold for viewing quality;

i) There is always the desire to preserve First Amendment rights.

Ideally, each comment could be scored with respect to quality, prior to posting, with a score that would "stand the test of time". However, as previously stated, human pre-mediation is costly and runs the risk of injecting unwanted human bias. In order to avoid these pitfalls, Slashdot (for example) generates an initial score based on a user's status, and then provides for modification of the score by actions of the user community (including paid staff). But this process results in significant modification of comment scores after a comment has posted. It would be desirable to generate an initial score that was closer to the "final" score arrived-at by consensus of the human users. While an accurate initial score is difficult to achieve with currently-available automatic content analysis software, the accuracy and stability of a computer-generated score can be enhanced by also considering the provenance of a comment a user's historical status, whether the comment or post "points to" (or cites) any information from other sources or references known to be of high-quality, and if so, whether the cites appear to be accurate. For example, automatic content analysis software cannot reliably determine that a given comment is of high quality; however, if it was posted by an individual who is known to generally make high-quality comments, this information can be used to skew the score toward the high end of the scale with greater confidence. Similarly, if a comment or post cites to verifiable information from a third-party source that is known to be of high quality, this information can be used to skew the score toward the high end of the scale with greater confidence. Hence, in a preferred embodiment, the present invention merges these two approaches (automated content analysis and consideration of user status) while retaining a post-moderation protocol to refine the scoring and allow users with low status to have their comments "promoted" to higher quality levels, thereby also providing a mechanism for such users to achieve higher status overtime.

Diakopoulos, Naaman, and Kivran-Swaine have reported on an analytic tool called Vox Civitas which relies on four types of automated content analysis: 1) relevance; 2) uniqueness; 3) sentiment; and 4) keyword extraction. Other types of content analysis are feasible. For example, it is straightforward to perform a spelling check against a standard dictionary (the contents of the dictionary can be adapted to match the needs of a site). It is also possible to check for vulgar and inappropriate language with a reasonable degree of confidence especially when all words are spelled correctly.

In regard to cited content from third-party sources, such as news articles and other material cited from online journals and publications, if that material is associated with embedded bibliographic data and authenticated by a secure hash as described above, the receiving host site can verify its authenticity. For example, the receiving host site can use the bibliographic data to retrieve the public key of the indicated source, and use that public key to verify that the cited material is authentic. This cam be done fora full and direct quote, as well as paraphrased material if the original material is also available in its entirety (for example, as "hidden text" in a submitted comment or post). If there are multiple layers of authentication for a particular content element (e.g., Bob citing to content reported by WebOneNews, which WebOneNews attributes to ScienceOne), the nested layers of authentication can be used to verify a conceptual "chain of custody" back to the original content developer.

Similar to a host site maintaining a list of "high karma" users, each host site can also maintain a list of known high-quality third-party sources such as reputable newspapers and magazines with online presence, online or electronically-accessible science journals and organizations, and the like. This could be described as a "white list" similar to the "white list" used to authenticate known "safe browsing sites" on the internet. However, in this case, the white list is used as an indication that the associated material is likely to be of high quality, and that the original creators attempted to ensure its veracity. Content that is authenticated to have been sourced from such a site can be associated with a high, score for veracity and accuracy.

Similarly, the host site could maintain a "black list" of known sources with a history of low-quality content, fake news, unsupported opinion, and the like. Content that is authenticated to have been sourced from such a site can be associated with a low score for veracity and accuracy.

It is recognized that high-quality sources will tend to exist for long periods of time such sources and organizations will typically spend years or decades developing a well-deserved reputation, and will work hard to maintain their standards and also their standing in the community. Some low-quality sources may also exist for long periods of time; however, low-quality sources will tend to have shorter histories, and many may be ephemeral. The widespread use of black lists may actually lead to reduced lifetimes of low-quality sources, as their owners/operators switch online identities in an attempt to avoid inclusion on a black list. Thus, a relatively unknown site, which is on neither a white list nor a black list, could be treated by an "evaluating host site" with caution, and either associated with an intermediate score for veracity and accuracy, or a low score that would typically be associated with a site on a black list.

White lists and black lists can be generated, and maintained by each host site independently, using their own or industry-agreed criteria, or procured from a third party (for example, a third party specializing in this function).

Referring now to FIG. 1, in one embodiment of the present invention, when a comment is received by a site at step 100, it is submitted to a set of automated content analysis filters that comprise spelling, vulgarity, relevance, uniqueness, sentiment, and keyword matching (as examples). Other embodiments of the present invention can comprise a subset of these filters or a superset (i.e., filters that are not identified in this list), however, the discussion here will assume the identified set. Each filter generates an automated score which may comprise a scalar or vector quantity. For example, in a preferred embodiment the spelling filter applied at step 210 generates a scalar numerical score proportional to the fraction of words in the post that are recognized in the dictionary. However, in alternative embodiments the score could boa more complicated function of the fraction of words that are recognizable, or even a vector quantity. For example, a vector quantity (multi-dimensional output) could be formed by calculating spelling accuracy across identifiable subsets of words comprising differing numbers of syllables, age-related lexicons, technically specialized lexicons, or the like. It is also expected that a preprocessor or equivalent process can be applied to exclude from consideration such embedded elements of the comment as bit maps, URLs, email addresses, recognizable mathematical symbols and equations, and the like. Since it is generally easier to recognize vulgarity and perform other forms of content analysis if all words are recognizable, in a profaned embodiment the spelling score is made available to other filters applied at steps 220 and 230 (in other embodiments the spelling score is only made available to a proper subset of the remaining filters, including possibly none of them at all). In one embodiment, the vulgarity filter generates a vector score relating to: a) the apparent level of obscenity, hate speech, and ad hominem argumentation; and b) the level of confidence in the scoring. The level of confidence may be informed, in part, by the output of the spelling filter. In other embodiments, the vulgarity filter could contain a subset or superset of the indicated measures (obscenity, bate speech, and ad hominem argumentation), or might output only a scalar quantity. Additional content analysis filters applied at step 230 (e.g., relevance, uniqueness, sentiment and keyword matching) operate on the content of the post, generating vector outputs including both a numerical score on each metric as well as a confidence level. Relevance and keyword matching scores can be based in part on the subject news item illustrated in FIG. 1 as provided by input step 250 (as an example). Keywords may have been previously identified by a human operator or journalist (as an example), or generated automatically. Uniqueness scoring can be based on prior posts relating to the same news item, as well as (optionally) other databases available to the filter. Sentiment scoring can be based on semantic analysis of the comment or post, generating a numerical score for subjectivity versus objectivity. In one embodiment of the invention, a confidence level is generated as part of the vector output, said confidence level based in part on the output of the spelling filter. In other embodiments, the confidence level is formed without benefit of the spelling filter output, or may be non-existent. In cases where the confidence level is non-existent, the output of each filter could be a scalar quantity (although in some embodiments, vector outputs can also be generated by generalizing the methods described above).

In an embodiment adapted to evaluate the authenticity of cited material from third-party sources, a "veracity" content analysis filter checks for the presence of hashed material that can be verified by processing with a public key associated with the indicated third-party site (which could be the host site itself). Consider, first, a simple case where only a single layer of authentication is present, and the cited material is quoted in its entirety. The veracity content filter attempts to authenticate each such instance of cited material. If authenticated against a site on a "white list", the particular citation so authenticated is assigned a high score for veracity (e.g., "1"). Alternatively, if authenticated against a site on a black list, or a site that appears on neither a white list nor a black list, or if the authentication fails, the particular citation is assigned a low score for veracity (e.g., "0"). An overall veracity score, for the comment or post as a whole, can be generated by a suitable mathematical function operating on the individual scores so obtained. One such mathematical function is the arithmetic average of the individual scores so obtained. Another such mathematical function is the product of the individual scores so obtained. Note that, in the case of individual scores that are binary 0/1, the "product function" results in an overall score that is either "1" if all cited material is verified to derive from "white list" sources, and "0" otherwise. This is an aggressive approach that eaten to the highest-quality sourcing and the highest level of care in developing new comments/posts, but one which may be considered desirable in certain circumstances.

It will be appreciated that scores other than binary 0/1 can be assigned to individual citations, and other mathematical functions can be applied to generate an overall score for a comment or post. Non-binary scores can be assigned to individual citations if it is desired to distinguish between black listed versus unlisted sources, or to give particularly low scores to content that appears to be an explicit and complete quote of a cited source, but which fails validation. In this case, as one example, scores might be assigned as: white (1); unlisted (0.3); black (0.2); failed (0). In this case, a "product function" for generating an overall score would still result in "0" for a comment or post with at least a single failed validation, and even a significant number of unlisted or black-listed sources would drive the overall score to a value close to zero.

In one embodiment adapted to evaluate paraphrasing and incomplete quotations, and even generic supporting citations without directly-quoted material (but where the cited content is still embedded or otherwise accessible), the first level of machine authentication is further adapted to (or augmented with a second level of machine authentication adapted to) perform syntactical analysis. Specifically, if authentication fails due to a lack of quotation marks (no apparent quote) or a mismatch between the quoted content and the authenticated material (i.e., due to paraphrasing or an incomplete quotation), die veracity content filter or a second content analysis filter (e.g., an "author argumentation quality analysis filter") attempts to apply syntactical analysis to compare the paraphrased or incomplete material, offered visibly to a reader, or the sentence containing or immediately preceding the citation, against the full extent of the cited content that is embedded (or otherwise accessible), and verifiable from a third-party source. This is an important element that allows for flexibility in developing content, and can also be used to prevent "bad actors" from "gaming the system". For example, a bad actor might include hidden citations to material from highly respected sources, but with little or no relevance to the points or commentary being made in the visible or obvious submission. This would be a way to camouflage "fake news". Methods to discourage such activity are desirable.

Referring again to FIG. 5, an example of nested content with paraphrasing is provided. In this example, the original content is provided by an article appearing in ScienceOne at block 510. Bob cites to this original content in block 520, but uses paraphrasing instead of an explicit quotation. Note that his post includes an indication of the "visible content" that Bob wishes to indicate is supported by the reference (here indicated by underlined and italicized text), and the post also includes a reference to the original content (this reference could be embedded, or a pointer to content available online;

also, it could be nominally hidden from direct view, although visible with suitable editing and viewing tools). Also illustrated in FIG. 5, at block 530, Alice offers a user post responsive to Bob's user post. Alice's post ineffectively a literal quote of Bob, although she does not use quotation marks or any other visible syntax to indicate a direct quote.

Several metrics for scoring paraphrased content can be applied. For example, if a post contains a paraphrased or incomplete quotation (or unquoted material impliedly supported by the cited material), the words in the paraphrased or incomplete quotation, or unquoted material (such as the sentence containing a citation or immediately preceding a citation), can be compared to the words in the full extent of the cited content to verify that allure present (or almost all are present). A score can be assigned based on the fraction of "visible words" that are found in the full content, thereby discouraging a developer of content from adding additional material to a passage that is attributed or referenced to someone else. The score could be a simple ratio of words found divided by total "visible words", or a more elaborate function that would be comparatively tolerant of a minor addition (i.e., in the interest of readability), but highly adverse to more significant additions. The score could optionally include a factor to test the extent to which words found in common, between the paraphrased/incomplete quote (or unquoted material) and the full content, occur in the same order (i.e., since the order of words can sometimes significantly affect overall meaning). The score could also optionally include a factor to test the total number of words in the paraphrased or incomplete quotation (or unquoted material), as a fraction of the total number of words in the full content. This test would discourage bad actors from, associating high-quality hidden citations with e.g. blank spaces or small articles such as "a" or "the", in an attempt to improperly boost their machine score for veracity.

In one embodiment as described above, in the event of an authentication failure due to a lack of quotation marks (no apparent quote) or a mismatch between the quoted content and the authenticated material (i.e., due to paraphrasing or an incomplete quotation), instead of assigning a score of zero to a cited content element (for authentication failure), the content is assigned a score calculated by multiplying the white/black/unlisted score with the syntactical score. Thus, content that is attributed to be supported by a "white listed" source, but is not authenticated due to a matching failure between the visible content and the authenticated content, is assigned its syntactical score as described above. Similarly, and by way of example, content that is attributed to be supported by a source not found on any white list or black list, and which is not authenticated, is assigned its syntactical score multiplied by 0.3.

In one embodiment, in the event of an authentication failure due to a mismatch between explicitly quoted content and the authenticated material (i.e., due to paraphrasing or an incomplete quotation), the final score is set to zero if the quoted material is presented as a complete quote (i.e., no ellipses or other indicators to indicate paraphrasing), and is set to the product of the white/black/unlisted score with the syntactical score if the quoted material contains proper indications of paraphrasing. This scoring methodology discourages improper citation.

As the ability of software algorithms to interpret human language increases, a content analysis filter, such as an author argumentation quality analysis filter, could apply more sophisticated tests to determine whether a paraphrased or incomplete quotation actually carries the same meaning as the full content it references. For example, the inclusion or exclusion of a single word such as "not" might dramatically change the meaning of a passage, but not significantly affect the metrics described previously above. Thus, the score could optionally include a factor (which in one embodiment is a binary factor) which compares the number of "not" words, and assigns a value of e.g. "1" if the visible content contains the same number of "not" words" as the original content, and assigns a value of e.g. "0" otherwise. More sophisticated syntactic analyses could potentially identify more subtle changes, and reduce the overall veracity score (or a separate score) suitably, in the event that the meaning appears to have been altered.

For nested authentications (e.g., Bob has signed content which he attributes to WebOneNews, which WebOneNews bad previously attributed to ScienceOne), several scoring options exist. A few of these will be described here; those of skill will recognize that other scoring options are possible.

In a first option for scoring nested authentications where there are "k" layers, a non-negative score is generated at each layer of nested authentication, these scores are multiplied together, and the kth root of this product is taken to form a score for the nested content. For example, if Bob is a "white listed" source, the outermost layer would be assigned a score of 1 (since Bob is white-listed and his content matches itself). The second layer would be assigned a score based on the white/black/unlisted status of WebOneNews, and the extent to which Bob has quoted WebOneNews exactly, or paraphrased. The third layer would be assigned a score based on the white/black/unlisted status of ScienceOne, and the extent to which WebOneNews has quoted ScienceOne exactly, or paraphrased. These three scores are multiplied together and the cube root of this product forms a single combined score for the content in Bob's comment or post containing these nested authentications.

In a second option for scoring nested authentications, scores are generated for each layer as described above, but they are combined by forming the inverse of the sum of inverses of the individual scores (i.e., similar to finding the parallel resistance of a set of resistors).

In a third option for scoring nested authentications, the existence of a karma certificate is considered in the scoring methodology. For example, a particular host site may choose to assign a "veracity equivalence" of 0.9 to a user with a particular karma certificate (which may depend on a separate score for the site that awarded the certificate). Then, if the content at a layer is attributed to such a user, the score at that layer may be taken as the "MAX" of the syntactical score as calculated above, and the "veracity equivalence" associated with the karma certificate. As another option, the layer score could be taken as the harmonic mean (the square root of the product) of the syntactical score and the veracity equivalence of the karma certificate.

At step 300, an a priori score is generated based on the output(s) of the filter(s) applied to the content of the comment/post, but excluding consideration of the status of the user submitting the comment. In one embodiment, the indicated filters generate scalar numerical scores (although these are possibly paired with a confidence metric to form a vector output), and the a priori score formed at step 300 is a single scalar quantity formed by summing the numerical scores from each of the filters without consideration of confidence levels. In another embodiment, the a priori score is a scalar quantity formed by a different mathematical process. For example, the mathematical process could form a linear combination of a subset of the scores (e.g., forming a weighted sum of scalar scores for relevance, uniqueness, veracity, sentiment and keyword matching, where the weighting factors are functions of the confidence levels associated with each of these scores) and this linear combination (a single numerical value) is multiplied by a normalized score between zero and one representing spelling accuracy and lack of vulgarity. For example, in the context of a host site where truthfulness and fact-checking is important, such as a news organization (e.g., WebOneNews), the veracity and author argumentation quality (if measured separately from veracity) can be given relatively significant weighting, compared to the weighting applied on a host site where truthfulness and fact-checking is less important In another embodiment, the a priori score is a vector score simply representing all of the scored outputs of all of the filters applied (i.e., step 300 merely collects all of the outputs of the various filters and makes them available to the following step). In yet another embodiment, the a priori score is a non-trivial (i.e., not a simple scaling), linear or nonlinear, vector function of the inputs (the filter scores and confidence levels).

At step 450, an a posteriori score is generated based on the output of step 300 as well as the status of the commenting user optionally received as step 400 and accepted and mapped to the site's own status hierarchy in step 410. The nearest analog to user status, in the Slashdot lexicon, would be "karma"; however, the user status in the present concept is more elaborate, intended to represent a long-term commitment to high-quality discourse (although other status measures such as academic achievement, reputation as a mentor on peer-assistance websites such as StackOverflow, and performance status on sites such as Taskrabbit, assessing the performance of a user in relation to a set of performance criteria, could also be encoded, as examples); and may be portable (i.e., accessible on a site that did not generate the status in the first place). In keeping with the principles discussed earlier, if the status is portable, a user can submit credentials along with a post (or previously, at the time of setting-up or updating an account) that would indicate the level of status achieved in other domains or on one or more different sites credentials that are difficult to counterfeit. For example, a user might submit credentials from an academic institution, a general-interest online discussion site, and a special-purpose professional site associated with a particular profession (such as, e.g., StackOverflow). In keeping with the principles discussed earlier, these credentials can be authenticated (as part of step 410) to ensure that a user does not masquerade as someone with credentials that he/she has not earned.

As part of step 410, the user status can be mapped to the status hierarchy used on the site. For example, two news sites might accord essentially "full face value" to each others' certificates, whereas a special-purpose scientific site might accord only partial value to a certificate from a general-purpose news site (thereby mapping a high-level certificate from the news site to a level closer to a null score on the special-purpose site). Conversely, a general-purpose news site might accord full face value to a user with a specialized certificate, in relation to a news item that is strongly correlated with the specialized expertise represented by the certificate, but only partial value in relation to a news item that is not strongly correlated with the specialized expertise represented by the certificate. This mapping can be facilitated with an industry standard defining minimum standards of good behavior and accreditation (for example), but could also be performed by other means. For example, an operator of a site could learn of the status hierarchies of other sites (at least other popular sites) and build a table to achieve a reasonable mapping to the operator's own site's status hierarchy. The mapping table can be updated periodically. Alternatively, a site might form either a "distance metric" or a "correlation metric" between itself and the site that awarded an offered certificate by relying on an indexing scheme such as contained in Wikipedia, or correlating key words associated with the offering site's content, or the recognized domain of relevance of a site or entity, against key words on its own site (or a particular post, job listing, or other item for which the user has identified an interest). Based on a distance or correlation metric, or a combination of distance or correlation metrics associated with a plurality of offered certificates, the site can determine a suitable status level for the user in relation to the site or entity as a whole, or in relation to a particular news item, commentary, question, job, or other item of interest.

One potential mapping method for a single offered certificate is to:

a) determine a correlation score, between zero and one, for the relevance of the certificate's awarding site to the current site;

b) determine a ranking score of the offered certificate relative to the highest level of achievement recognized by the certificate's awarding site (this score is also assumed to be scaled between zero and one for the current example, and may be arbitrarily set to one if the ranking hierarchy of the certificate's awarding site is unknown, but this is not a firm requirement of the inventive concepts described herein);

c) multiply the correlation score by the ranking score to form a first product; and d) map the first product to the ranking hierarchy of the current site, where the one or several levels of achievement recognized by the current site is/are associated with numerical values including a maximum value, and the mapping is performed by multiplying the first product by said maximum value to form a second product. In one embodiment, this second product (which may be non-integer) is truncated to the next lowest value associated with an achievement level recognized by the current site, and the associated achievement level is assigned to the user as a credential for general use, or for a particular post (depending on the nature of the site and its operating strategy). In another, embodiment, the second product is "rounded" to the nearest value associated with an achievement level recognized by the current site, and the associated achievement level is assigned to the user as a credential for general use, or for a particular post. In an embodiment that employs rounding, the thresholds for "rounding up or down" can be spaced mid-way between the numerical values associated with the recognized achievement levels, but this is not a requirement (i.e., a given threshold might be closer to one neighboring value than the other).

When a plurality of certificates are offered, in one embodiment the certificate with the highest correlation to the current site is determined, and this single certificate is used to determine a mapping of user status by the method described above. In the event of a tie (multiple certificates are presented with associated awarding sites having the same first-place ranking of a correlation metric to the current site), the tie among these "first-ranked" awarding sites is broken by calculating the "first product" for each, and using the maximum such fast product in step d above (note: a tie among first-ranked "first products", should it occur, will not affect the calculation in step d). In another embodiment, when a plurality of certificates are offered, a "second product" is formed for each, using the methods described above, these second products are averaged, and the resulting average second product is truncated or rounded to a recognized achievement level for the current site using the methods described above. In a third embodiment, when a plurality of certificates are offered, the associated set of first products, formed insteps above, each between zero and one, are used to form a set of inverted metrics by subtracting each said first product from one. These inverted metrics are multiplied together and the resulting product is itself subtracted from one, to form a "merged first product" that can be used in step d above. Specifically, the merged first product MP1 is formed from the set of first products {P1} by applying the formula $$MP1 = 1 - \prod_{k=1}^{N}(1 - P1_k)$$

where N is the number of certificates presented, and $P1_k$ is the k-th certificate, $1 \le k \le N$. This formula has the feature that any single "perfect first product" (i.e., with a value of 1) results in a perfect "merged first product", and multiple certificates can be combined to boost a user's score, but it is not possible for a user to exceed a perfect score with any number of certificates.

Other methods of mapping a set of user credentials to the achievement hierarchy of the current site will be apparent to those of skill in the art. For example, it may be recognized that the above formula allows a user with a large number of mediocre certificates to achieve a high "merged first produce". In order to overcome or mitigate this, problem, a site might also form the simple product "SP" of all the "first products" calculated in step c above, and then calculate a weighted average of SP and MP1 in order to forma new metric AP1 that can be used in step d above. In forming the weighted average, Si' can be weighted increasingly heavily for values less than one-half. Many weighting algorithms are feasible. One that may be envisioned is to form $$AP1 = SP((SP^{-1} - 1)SP + MP1)$$

Thus, when SP=½, SP and MP1 are weighted equally, and as SP gets smaller, it becomes increasingly heavily weighted. A large number of mediocre first products will tend to drive SP toward zero and MP1 toward 1, and the weighted average AP1 will tend to be closer to zero than to one. Thus, a user would have an incentive to offer a limited number of high-quality certificates that are expected to correlate well with the current site, instead of a large number of certificates containing a mix of higher and lower quality, with widely-varying levels of expected correlation.

The offered credentials may be self-describing to a certain degree (possibly defined within a published standard), allowing this mapping (and more specialized mappings) to be achieved automatically. Thus, as described above, an expert on international relations with a specialization in Middle Eastern studies might receive a certificate from "Foreign Affairs" magazine identifying this particular area of expertise. Such a certificate, offered to a general-purpose news site on a story associated with the Middle East, might be instantly accorded the highest status. Conversely, when offered to the same news site on a story associated with lunar exploration, might be accorded only slightly higher than a "null" status since the site might assume a certain level of inherent decorum, but no particular expertise. These mapping possibilities are offered as examples; the mapping process implemented by any particular site is subject to optimization according to the needs of the site, and can evolve over time.

Of course, a comment or post might be submitted without any user-supplied credentials at all. If the user is known to the sit; a user status may optionally be drawn from memory for the purpose of determining an a posteriori score for the submitted comment. Alternatively, in embodiments that do not rely on a memory to supply missing credentials to known users, and also in all embodiments that must deal with unknown users without credentials, two methods can be employed in keeping with the principles of this invention: 1) assign a "null" status that is differentiated from all valid status indicators; or 2) assign the lowest possible status indicator.

The a posteriori scoring process identified in FIG. 1 determines a single numerical score for the comment, post, or resume, based on the a priori score (possibly a vector quantity) and the user status. Examples of a posteriori scores, that could be generated by one or several embodiments of the present invention when user credentials are supplied, include among others:

a) The a priori score (if it is a scalar) shifted by a numerical amount "D" determined by the user status via table lookup or a numerical algorithm (e.g., if the user status is a numerical value or can be mapped to a numerical value, one candidate numerical algorithm is to map the user status (omits mapped numerical value) to a range such that $-D_{max} < D < D_{max}$, where $D_{max}$ is no greater than the maximum possible a posteriori score, add D it to the a priori score, and bound or renormalize the resulting sum so that it is within the available range for an a posteriori score;

b) The a priori score (if it is a scalar) normalized to a predetermined range, with the resulting score shifted by a numerical amount "D" as suggested above, with the resulting sum bounded or renormalized so that it is within the available range for an a posteriori score;

c) The a priori score (if it is a scalar) normalized to a predetermined range and scaled according to a scalar confidence metric (bounded between zero and one) based on the confidence levels associated with the various filter scores, with the resulting score shifted by a numerical amount "D" as suggested above, with the resulting sum bounded or renormalized so that it is within the available range for an a posteriori score;

d) The sum of the individual filter scores, or the sum of the individual metrics of the a priori score (if it is a vector), excluding confidence metrics, if any, normalized to a predetermined range, with the resulting score shifted by a numerical amount "D" as suggested above, with the resulting sum bounded or renormalized so that it is within the available range for an a posteriori score;

e) The sum of the individual filter scores, or the sum of the individual metrics of the a priori score (if it is a vector), excluding confidence metrics, if any, normalized to a predetermined range and scaled according to a scalar confidence metric (bounded between zero and one) based on the confidence levels associated with the various filter scores, with the resulting score shifted by a numerical amount "D" as suggested above, with the resulting sum bounded or =normalized so that it is within the available range for an a posteriori score;

f) a Bayesian method that uses historical data on a priori scores (including confidence levels, if available), user status values (including a possible "null" status), and post moderation scores measured after a period of public viewing, all supplied by step 420, to determine a nominal a posteriori score that is most likely to represent a final post moderation score for the current comment or post. In this method, data is collected and stored over time regarding the scalar or vector a priori scores, user status values, and post moderation scores measured after a period of public viewing, for some or all of the comments on the site.

These data are used to define and calculate as appropriate the following things:

a. For each final score $FS_i$ defined on the site, let $p(FS_i)$ be the probability that an arbitrary (randomly-selected) comment or post has that score following a suitable post-moderation period for human-mediated moderation;

b. For each input vector $ID_j$ defined on the site, representing the a priori score, confidence values (if any) and user status (including "null" status), let $p(ID_j)$ be the probability that an arbitrary comment or post was initially associated with that input vector. For this calculation, comments with no known user status should be treated as having "null status" instead of the lowest possible status, regardless of how such comments are treated in step d) below, in order to generate a more accurate set of statistics;

c. Let $p(ID_j|FS_i)$ be the probability of a comment initially exhibiting the input vector $ID_j$, given that its post-moderation final score was $FS_i$;

d. For each new comment or post received, calculate the set of conditional probabilities $p(FS_i|ID_j)=p(ID_j|FS_i)*p(FS_i)/p(ID_j)$, where $ID_j$ is the input vector associated with the new comment or post (i.e., its a priori score, confidence values (if any) and user status). For this step, as discussed earlier, different embodiments can choose to treat a comment with no apparent status (i.e., no offered status or no known status in memory) as having either "null status", or the lowest possible status;

e. Pick the $FS_i$ that maximizes $p(FS_i|ID_j)$, and assign this score as the a posteriori score for the new comment or post.

Those of skill in the art will recognize that other methods of forming an a posteriori score are feasible and are within the bounds of the invention.

At step 500, the new comment or post is posted to the site for public viewing along with its a posteriori score as determined at step 450. Optionally, as indicated by step 600, the site may offer its users the chance to "post-moderate" the score. This step is necessary to implement the Bayesian a posteriori scoring method noted above. Over time, the a posteriori scoring method allows the automatic generation of a score that is fairly likely to closely approximate the final score awarded by humans in a post-moderation scoring process.

In the case of a company processing resumes, the new resume would not be posted publicly, but would be viewed internally by selected staff (e.g., human resources). This selected population would optionally, as indicated by step 600, "post-moderate" the score based on, e.g., how well the submitted resume matched the company's identified job requirements. This could even include a component associated with a final hiring decision. Over time, the a posteriori scoring method allows the automatic generation of a score that is fairly likely to closely approximate the final score awarded by humans in the post-moderation scoring process.

In order to implement the Bayesian a posteriori method, the inventive concept relies on a representative database of recently-received comments (or resumes, in the case of a company seeking employees or consultants) including their associated a priori values, the user status of the submitting user (which may also be the null status), and the post-moderation values after a period of human-mediated moderation on the site (or within the company). The size of the database will affect the performance of the system. If the database is too small, the a posteriori scores will not exhibit very good correlation with the post-moderation scores. As the size of the database increases, the correlation will improve. At some point, further increases in database size will not result in significant improvement in correlation. Those of skill in the art will recognize that offline experimentation can be used to determine a suitable database size that yields correlation values close to the maximum achievable values, but is not too extravagant in terms of memory requirements.

Viewing and Display Methods for Online Discussion for a User

As with the Slashdot approach, users can be given the ability to select a viewing level and thereby suppress, from their individualized view, all comments/posts below their selected viewing threshold. Alternatively, a site could choose to offer multiple tabs or viewing panes, with one such tab or viewing pane devoted to high-quality posts above a predefined threshold, and another such tab or viewing pane devoted to all the viewable posts regardless of quality. Going further, a host could actually maintain two sites one for high-quality comments and the other for all comments. Comments could be dynamically posted or removed from the high-quality site depending on its dynamically changing score. This could, for example, allow an organization to maintain a "family friendly" site as well as a less constrained site. For any of these methods, the site may choose to completely suppress the viewing of particular comments or posts that are judged (either automatically or after human mediation) to be extremely objectionable. With the exception of these extremely objectionable comments, all comments are posted in one way or another and free speech is maintained. However, low quality posts are only seen by a particular viewer if the viewer has intentionally "opened the filter" to allow them (or selected the viewing tab that shows all viewable posts regardless of quality, or navigated to the essentially unfiltered site).

The methods described here can be adapted to support e.g. a relatively technical discussion on one tab or site (or above a given quality threshold using a metric of technical detail or complexity) and a relatively less technical discussion on a different tab or site (or with a lower threshold of technical complexity), with comments dynamically posted or removed from the relatively technical tab or site (or viewed above a given selection threshold) depending on its dynamically changing score.

Sponsors and advertisers may optionally choose to be associated with particular viewing thresholds, tabs, or sites. In a more nuanced approach, sponsors and advertisers, may choose to tailor their advertising (messaging/formatting) to the viewing threshold, tab, or site. For example, a medical research company might choose to announce job offerings and solicit paper submissions for a conference on a relatively technical viewing threshold, tab or site, while simply maintaining a "public awareness message" on a less technical viewing threshold, tab or, site. Manufacturers and service providers might also choose to tailor their advertising to, the anticipated demographics associated with a particular viewing threshold (or more generally, a set of viewing metrics), tab, or site.

As noted earlier, comments or posts with embedded content from third-patty sources, if properly cited according to the methods disclosed herein, allow users (readers and viewers) to check the veracity of individual citations on their own, and independently assess the degree to which the developer. (Bob) has accurately captured or represented the cited content. This can be performed with suitable web applications, web browser add-ons, or other viewing tools (such as e.g. Word™, adapted to this purpose. The e.g. viewing tool is hosted on a computing device comprising at least a computer processor, a memory, one or more input/output devices (or peripherals) for human input and output, and at least one communication device (or peripheral) adapted to access a communication network, which in turn provides access to the Internet. The computing device also comprises software adapted to serve as a web browser, and adapted to support the editing, information retrieval, uploading of user posts, and scoring functions described herein. For example, the e.g. viewing tool may have the ability to copy and paste the full context of user-selected content (including digitally-signed hashes, or pointers into a digitally-signed hash manifest), as well as the ability to generate its own digitally-signed hashes for a user, or rebuild a digitally-signed hash manifest as part of e.g. a standard "save" operation.

In order to validate each citation, the viewing tool must have access to the indicated public key. The public key can be embedded in the document or retrieved over the Internet from a commercial entity. If the public key is embedded in the document, validation of citations can be performed offline. It is desirable to embed the public key in the document when it is desired that the viewing tool can be used offline (such as e.g. Word™). However, offline use entails a slight reduction in integrity since a "bad actor" could masquerade as an e.g. white listed entity with a false private and public key (the false private key for encrypting counterfeit content, and the false (matching) public key embedded in the comment or post for allowing an unsuspecting user to decrypt the counterfeit content). However, the risk is mitigated since any user could compare the embedded public key to a validated public key for the same apparent entity, available online from a trusted source. If the viewing tool will only be used online (such as e.g. Facebook™ or Google™), either approach for gaining access to the public key is valid. In scenarios where data size of the document must be kept as small as possible, it is recommended to retrieve the public key from a commercial entity. A web application, existing web browser, or alternative viewing tool can be augmented with a module to support this function, just as an existing web browser (or Word™) can be augmented to include an Adobe™ pdf creation capability, or an extended-capability equation editor. Microsoft™, for example, allows developers to develop add-in applications for Office™ products: https://msdn.microsoft.com/en-us/library/cc442946.aspx A viewing tool or add-in module provided by a commercial entity, adapted to verify cited content, could be initially delivered and periodically updated to include white lists and black lists of third-party sites. The white lists and black lists could be retrieved by the viewing tool or add-in module and stored locally, or the lists could always be stored in a commercial entity's database. These can be used by the viewing tool (or its add-in module) to display warnings to the user (reader or viewer) if one or more cited passages are identified with black-listed sites (sites that have a poor record of veracity and accuracy), or merely one or more cited passages attributed to sites that do not appear on any white list or black list. Similarly, a viewing tool or add-in module could contain its own content analysis filters (e.g., for veracity and author argumentation quality), and these could be used to provide a cautionary warning (a "heads-up") in the event that certain cited passages appear suspect due tot low machine-generated score.

Alternatively, or in addition, a host site can maintain (or periodically acquire) its own white lists and black lists, and provide warning services to its users (readers and viewers) in addition to its overall scoring function.

In order to distinguish warnings generated by a viewing tool, versus warnings generated by a host site, the former could be presented to the user (reader or viewer) as e.g. "Google™ wants that . . . " or "Word™ warns that . . . ", whereas the latter could be presented to the user as e.g. "WebOneNews warns that . . . ".

Awarding Higher Levels of Status to Users

Various methods may be used to track user performance and reward users that generate high quality comments with enhanced status. Comment quality can be judged according to a priori score, a posteriori score, or the post-moderated score following a suitable period of human mediation. For this discussion, the site is assumed to maintain a database of registered users along with their current status levels ("karma levels"), although in this discussion no association with Slashdot methods or operating concepts is assumed, and post-moderation scores are used.

As an exemplary method, "karma points" are awarded or deducted based on a user's activity, and at periodic or non-periodic intervals, the user status is reviewed and increased or decreased to a different karma level (or left at the same level) based on user's current karma level and the number of karma points accrued since the last review. The number of karma points accrued could be a positive or negative number, or bounded (constrained) to be non-negative.

One possible method for awarding or deducting karma points, after a comment has experienced a suitable period of human mediation, is to award the user K additional karma points if the comment exceeds a predetermined quality threshold Thigh, and deducts karma points if the comment falls below a predetermined quality threshold Tlow≤Thigh. The values K and J are not required to be equal (although they could be), and they may actually be functions of the post-moderation score.

While not a requirement or constraint of the present invention, the number of karma levels is expected to be limited and the requirements to ascend to the highest karma level(s) are expected to be relatively stringent.

In some cases, it may be desirable to provide "checks and balances" to guard against abuse of the post-moderation system. For example, on sites devoted to online discussion, a vindictive user might repeatedly "mark down" a post from a particular user, or all posts from a particular user. Alternatively, a user's friends might repetitively vote "in favor" of a given post, or all posts from that user, in order to artificially inflate the apparent post-moderation score of one or several posts, and ultimately affect the karma level accorded to the user. Thus, in some cases, it may be advantageous to limit the number of voting opportunities afforded to any one user over a particular span of time (such as, e.g., a day or a month), or limit the number of voting opportunities that a given user may apply to a single post, or a single other user (for example, each user might only be able to vote once on any given post, or N times per day in relation to any given user). Some existing sites already limit the number of voting opportunities, limit the users who can vote (i.e., paid staff may have an unlimited ability to vote, but other users may only receive a limited number of voting opportunities, or tokens, depending on their status), and implement procedures to identify and minimize the impact of "abusers". Of course, it would be inappropriate for a user to be able to vote on his/her own posts.

In some cases, a well-meaning user may anticipate significant negative voting in a post-moderation system even for a cogent, thoughtful, and well-meaning comment. This could lead to self-censorship and an overall chilling of online commentary and discourse. For example, a user that had carefully built an exemplary record, and had achieved high karma, might be wary of posting a politically-charged comment that could be expected to generate a great deal of negative votes from those in an opposing political party, even though the comment was purely informational in nature. Even with limits on voting opportunities, a determined cohort might overwhelm the voting on a particular comment or post. In order to mitigate this issue, in one embodiment of the present invention, a user can preemptively flag a comment for special handling. For example, a tag such as "controversial" or "against the grain" might be provided by the site, and a comment tagged in such a way by a submitting user would be treated using a special procedure. For example, post-moderation scoring might still be allowed (indeed, other users might not even be aware that the comment or post had been tagged in such a way), but any impact on the submitting user's karma level would be reduced by a predetermined amount or eliminated entirely. Such comments may also, at the option of the managing site, be excluded from the database used by a Bayesian a posteriori scoring method.

User Experience and Motivation

Now consider, further, how the inventive methods affect the user experience. First, comments and posts are initially "posted" to the viewable area with quality scores that tend to reflect the scores they will ultimately receive following human mediation. In many cases, it will not be necessary for users to "bump them up" or "bump them down" in order to get them to the correct level. Users are not required to "explore at low quality levels", to the same degree as in prior systems, in order to find high-quality posts that deserve, to be promoted.

Furthermore, user posts that are of questionable veracity can be flagged automatically as a warning to the human viewers. Conversely, user posts that are well-sourced, relying on "white-listed" sources and with proper citations, are awarded a high veracity score.

Users with high status will find that their comments and posts are quickly (perhaps immediately) awarded an initially high quality score that allows their comments and posts to be seen by the greatest number of viewers. This allows them to have a significant impact on the online discussion. With a portable certificate of status, this is achievable even on a site that the user has rarely or never before visited.

Users with low status will find that their comments and posts are still viewable at low quality settings (unless the comments are judged to be extremely objectionable). Such users can "rehabilitate themselves", and achieve higher status, by improving the quality of their comments and posts.

Companies and organizations that attempt to measure social media impact, such as PeerIndex and Klout, can potentially use the certificates of status, revealed by a user, as one input to an improved measurement methodology. These certificates of status are based on a "local measurement" associated with a particular site, interest group or demographic, and therefore tend to represent a meaningful measure of the user's impact in that domain. Furthermore, if the awarding site maintains reasonable controls, the measurement represented by the certificate of status can be accorded a high level of confidence. Finally, it is important to note that the certificate is awarded to the user, and it is the user that reveals it publicly in relation to his or her alternative persona, possibly including his or her true identity.

As previously noted, when a site receives a comment or post without any user status (i.e., a new user without offered credentials), it can either assign a "null status" or the lowest possible status indicator for the purpose of determining an a posteriori score. Assigning a null status will tend to "withhold judgment" on the comment by not automatically associating it with users of low status (although, depending on how human users interact with the system, a Bayesian a posteriori process may result in this happening anyway at least to a degree). This might be appropriate for general-purpose discussion sites with a large number of new users. Conversely, assigning the lowest possible status indicator tends to disfavor the comment by automatically associating it with users of low status, who tend to post comments of low quality. This places a penalty on new users, or users attempting to create a new online persona with no history. This approach might be appropriate for special-purpose discussion sites that expect their users to maintain a high level of decorum and quality. For such sites, users that are unwilling to present suitable credentials can still post comments, but the comment must be of extremely high a priori quality in order to receive a high a posteriori score.

Hardware and Apparatus Associated with the Invention

As will be appreciated by one skilled in the art, aspects of the present invention may be embodied as a system, method or computer program product. Accordingly, aspects of the present invention may take the form of an entirely hardware, embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to; an electronic; magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an, erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet. Service Provider).

The present invention is described in part with reference to a flowchart illustration and/or block diagram of methods, apparatus (systems) and computer program products according to an embodiment of the invention. It will be understood that each block of the flowchart illustration and/or block diagram, and combinations of blocks in the flow chart illustration and/or block diagram, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer-readable memory implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the specification and appended claims, an a priori score refers to a result produced by analysis of a user's comment without knowledge of the user's status.

An a posteriori score refers to a result produced by knowledge of a user's status and/or experience or empirical evidence of quality of a user's interaction in an online forum.

Figure 2:
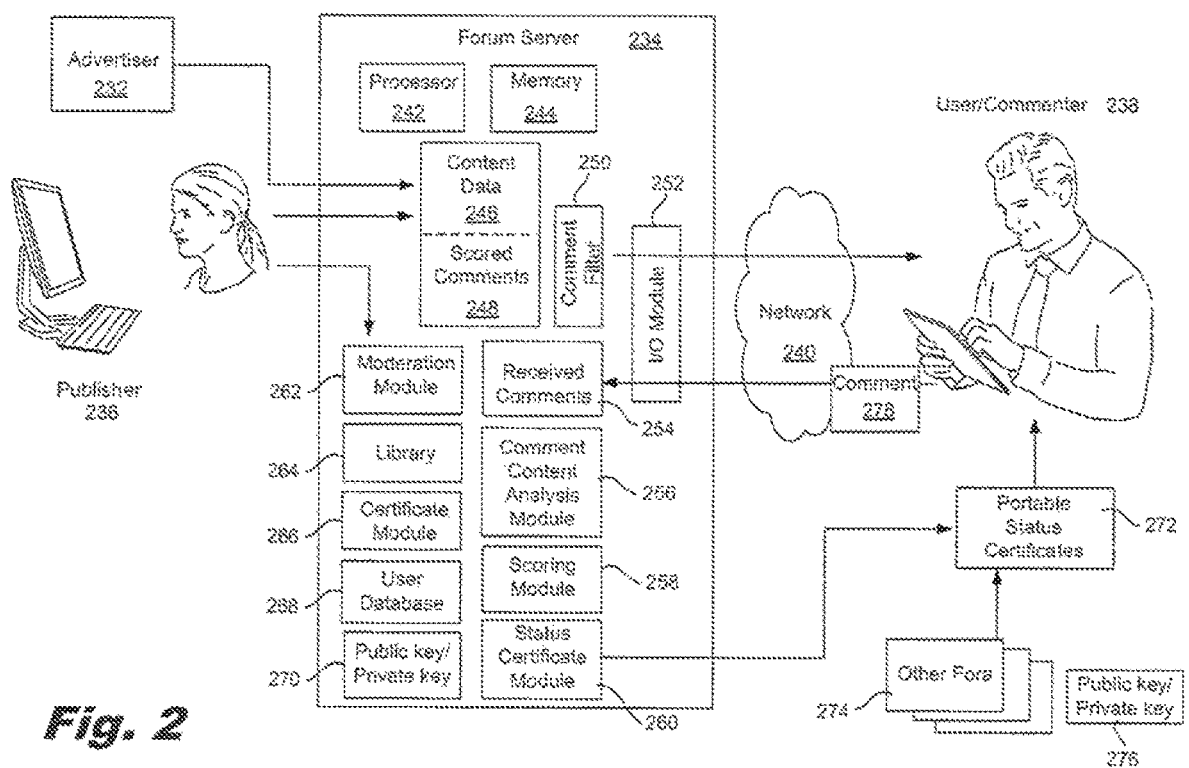
FIG. 2 is a diagram of an illustrative system for promoting learned discourse in online media, according to one example of principles described herein.

FIG. 2 is a diagram of an illustrative system for promoting learned discourse in online media. In this example, the system includes a publisher 236, an advertiser 232, a forum server 234, and user 238. The publisher controls operation of the forum server and posts content to the server for access by various users. The advertiser also posts content on the forum server for the consumption of users. The users access the thrum server to view/retrieve the content and to add content in the form of comments and other input.

In this implementation, the forum server includes at least one processor 242 and memory 244. The memory may include both volatile and non-volatile computer readable memory. The various modules in the forum server are executed as computer program code by the processor. The data used by the forum server including the computer program code, content, and databases are stored in the memory. The forum server shown in FIG. 2 is only one illustrative example. A variety of other configurations and systems could be used. For example, the forum server may be implemented by a plurality networked local/remote computing devices. Additionally, or alternatively, a portion of the functionality described as being executed by the forum server could actually be executed by a user's computing device.

The forum server stores content data 246 generated by the publisher(s) and advertiser(s) for viewing/retrieval by the user through an I/O module. For example, the forum server may be one or more web server(s) that supply and receive data over the Internet. The user connects to the forum server via a network 240 and views the content. The user is invited to comment on the content or other comments previously received to generate a discussion. The user's comment 278 is received by a received comments module 254. A comment content analysis' module 256 empirically evaluates the comment based on its content, but without knowledge of the user's status. As discussed above, the analysis module may evaluate the comment for spelling, vulgarity, content relevance to the topic of the content, and other factors. The analysis module may reference a variety of resources to more accurately make these evaluations. For example, the analysis module may reference the content data to determine key words or concepts that are present in the content. These key words/concepts can be compared to the received comment to determine its relevance to, the current content. The analysis module may also reference various libraries or databases. For example, a library 264 may contain a spelling dictionary and a list of vulgar or other undesirable words. The analysis module produces an a priori score for the comment.

The a priori score is received by a scoring module 258 that produces an a posteriori score by applying measures of the user's status. Specifically, the scoring module determines if the user who submitted the comment is known to the forum server or has supplied any portable status certificates 272. As discussed above, the portable status certificates can be generated by interaction with a variety of other online media sites, communities or organizations, including other fora 274. The portable status certificates generated by these entities may be encrypted using public key/private key techniques to help ensure authenticity of the certificates. The scoring module accesses a certificate module 266 which records and verifies the various certificates submitted by the user. The certificate module may also include a mapping between status hierarchies in various other fora and the status hierarchy of the forum hosted by the forum server. The scoring module determines how relevant the various certificates are to the specific content that was commented on. The scoring module may also access a database (supported by e.g. the library module 264) of recently-received comments including their associated a priori values, the user status of the submitting user, and the post-moderation values after a period of human-mediated moderation on the site, as well as a user database 268 maintained by the forum server to determine the reputation/behavior of the user on the forum server. The scoring module may then determine the relevance of the certificates to the current content/situation and modify the a priori score to produce the a posteriori score. This a posteriori score is associated with the user's comment, which is displayed accordingly in the scored comments 248. For example, if the comment has high quality/relevance and is submitted by a user with a high-status score, the comment may be featured prominently. However, if the comment is not relevant or lacks other desirable qualities, the comment may be filtered out or displayed with a lower prominence by a comment filter.

The a posteriori score may be further modified during operation of the forum server by a moderation module 262. The moderation module may receive inputs from the publisher, a dedicated moderator, and/or other users/commenters. This moderation may result in increasing, decreasing, or maintaining the score. In some examples, the forum server learns/adjusts the output of the analysis module and scoring module based on the results of the moderation which are stored in the comments database.

The publisher has control over the various modules in the forum server. For example, the publisher may define the list of vulgar or undesirable terms in the library. Additionally, the publisher may define how status certificates produced by other entities are evaluated in the certificate module.

A status certificate module 260 on the forum server produces a status certificate for the user based on the user's performance on the forum server. For example, the status module may gauge the user's performance both qualitatively and quantitatively. The status module may observe the number and frequency of the user's comments to determine the user's engagement with the forum. The status module may gauge the scores of the user's comments as a qualitative measure of the user's contribution to the discussion. The user can then use the portable status certificate on other sites to provide credence to comments the user makes.

The modules disclosed above are illustrative of the functionality of the forum server. The functionality may execute in a variety of ways, including combining functionality described in separate modules into a single module, adding modules, removing modules, and reordering modules. For example, functionality included in one or more of the modules may not be present. In one example, moderation after generation of the a posteriori score is not performed for some comments. In other implementations, the score assigned to the comment may rely solely on the status of the user communicated by the portable status certificate submitted by the user.

In one implementation, an application on a user/commenter's mobile device may be used in conjunction with the system described above. For example, the mobile application may be used to conveniently collect, store, and manage a user's portable status certificates. When a user is signing up for anew online forum, the application may suggest which certificates could be submitted to the forum for the highest rating. In some embodiments, the mobile application may analyze comments before the user submits them and may recommend changes to the comments to achieve a higher score. For example, the mobile application may check the comments for relevance, misspelled words, vulgarity, and for compliance with the terms of service for a particular website. The mobile application could also search for other content/discussions/sites that are related to the current conversation. The app could then help the user cite relevant references in making comments or take the user to an alternative location to do research or engage in the new conversation.

The flowchart and block diagram in the Figures illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

In one embodiment, the functionality described herein can be accessed externally from a primary server. For example, a server for a news organization that is already adapted to "pre-mediate" comments by a human mediator (e.g., a "super-user"), prior to posting, can grant mediator access privileges to an IP address associated with an external (i.e., third-party) server providing the evaluation and scoring functionality described herein. This third-party server can be commanded, by its-operator(s), to log into the primary server as a human mediator with suitable privileges to perform the disclosed machine-based evaluation and scoring, including, consideration of user-offered-certificates (if provided along with a post). Alternatively, the primary server can be adapted or modified to initiate an IP session with the third-party server and deliver new posts and comments for evaluation and scoring, either in a streaming or batch-oriented mode.

In one embodiment comprising a third-party server as described above, the third-party server is adapted to provide new status certificates according to criteria specified by the primary server (electronically, in real time), or criteria specified by the primary server's owner/operator (via off-line agreements between humans). In this embodiment, the new status certificates are provided to the primary server as encapsulated messages interspersed with the scored messages (i.e., with unique message headers indicating their contents), or via a logical or physical side-channel.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A server comprising:
   computer readable memory comprising:
   content data accessible to a number of users, wherein the content data comprises at least one discrete thought and a first hash of said at least one discrete thought generated with a private key of a public key encryption algorithm;
   an editing tool to copy the at least one discrete thought and the first hash of said at least one discrete thought, and embed the at least one discrete thought and the first hash of said at least one discrete thought into a post on a forum hosted by a forum server;
   wherein the editing tool is further adapted to generate a hash of at least the embedded copy of the at least one discrete thought and the hash of said at least one discrete thought, using a private key of a public key encryption algorithm, said editing-tool-generated hash being different from said first hash, and embed said editing-tool-generated hash into said post.

2. The server of claim 1, wherein the at least one discrete thought includes a paraphrased portion of an online document.

3. The server of claim 1, wherein the at least one discrete thought comprises multiple quotations from an online document.

4. The server of claim 1, wherein the at least one discrete thought comprises a single quotation from an online document.

5. The server of claim 1, wherein the at least one discrete thought comprises hashed bibliographic data that remains with the at least one discrete thought and points to the source of the at least one discrete thought.

6. The server of claim 1, wherein the editing tool detects the bibliographic data associated with the at least one discrete thought and places the bibliographic data as a footnote within the post in the forum.

* * * * *

UNITED STATES PATENT AND TRADEMARK OFFICE
CERTIFICATE OF CORRECTION

PATENT NO. : 10,686,609 B2
APPLICATION NO. : 16/026696
DATED : June 16, 2020
INVENTOR(S) : Heppe et al.

Page 1 of 1

It is certified that error appears in the above-identified patent and that said Letters Patent is hereby corrected as shown below:

In the Claims

Column 34, Line 21, Claim 6 change "server of claim 1" to "server of claim 5"

Signed and Sealed this
Twenty-second Day of September, 2020

Andrei Iancu
*Director of the United States Patent and Trademark Office*